(12) United States Patent
Niblett, Jr. et al.

(10) Patent No.: US 7,911,627 B2
(45) Date of Patent: Mar. 22, 2011

(54) DATA STRUCTURE FOR PERSONALIZED PHOTO-BOOK PRODUCTS

(75) Inventors: Kenneth Ray Niblett, Jr., Sunnyvale, CA (US); Sean Kevin Anderson, Covina, CA (US); Bert Olav Anderson, Los Gatos, CA (US); Jeff Boone, Sunnyvale, CA (US); Russ Ennio Muzzolini, Redwood City, CA (US)

(73) Assignee: Shutterfly, Inc., Redwood City, CA (US)

( * ) Notice: Subject to any disclaimer, the term of this patent is extended or adjusted under 35 U.S.C. 154(b) by 1091 days.

(21) Appl. No.: 11/524,218

(22) Filed: Sep. 19, 2006

(65) Prior Publication Data

US 2008/0068666 A1 Mar. 20, 2008

(51) Int. Cl.
*G06F 15/00* (2006.01)

(52) U.S. Cl. ...... 358/1.13; 358/1.4; 358/1.12; 358/1.15; 358/1.18; 715/221; 715/243; 715/255

(58) Field of Classification Search ................. 358/1.13, 358/1.12, 1.15, 1.18, 1.4
See application file for complete search history.

(56) References Cited

U.S. PATENT DOCUMENTS

| | | | | |
|---|---|---|---|---|
| 3,982,744 A | * | 9/1976 | Kraynak et al. | 270/12 |
| 4,209,187 A | * | 6/1980 | Forrest | 281/19.1 |
| 4,453,631 A | * | 6/1984 | Mark | 206/313 |
| 5,247,320 A | | 9/1993 | Kay | |
| 5,867,282 A | | 2/1999 | Fredlund | |
| 5,907,640 A | | 5/1999 | Delean | |
| 5,918,213 A | | 6/1999 | Bernard | |
| 5,926,288 A | | 7/1999 | Dellert | |
| 5,960,411 A | | 9/1999 | Hartman | |
| 6,005,482 A | | 12/1999 | Moran | |
| 6,123,362 A | | 9/2000 | Squilla | |
| 6,133,985 A | | 10/2000 | Garfinkle | |
| 6,202,838 B1 | * | 3/2001 | Tran | 206/232 |
| 6,206,358 B1 | * | 3/2001 | Yamaguchi et al. | 270/52.02 |
| 6,273,979 B1 | | 8/2001 | Lastoria | |
| 6,288,719 B1 | | 9/2001 | Squilla | |
| 6,321,231 B1 | | 11/2001 | Jebens | |
| 6,332,146 B1 | | 12/2001 | Jebens | |
| 6,353,445 B1 | | 3/2002 | Babula | |
| 6,362,900 B1 | | 3/2002 | Squilla | |
| 6,374,260 B1 | | 4/2002 | Hoffert | |
| 6,727,909 B1 | | 4/2004 | Matsumura | |
| 6,955,003 B1 | | 10/2005 | Lew | |
| 2003/0222396 A1 | * | 12/2003 | Kurahashi et al. | 271/207 |
| 2004/0098665 A1 | * | 5/2004 | Kasahara et al. | 715/500 |
| 2005/0060650 A1 | * | 3/2005 | Ryan et al. | 715/526 |
| 2005/0099438 A1 | * | 5/2005 | Lester et al. | 347/4 |
| 2005/0125726 A1 | * | 6/2005 | Harper et al. | 715/517 |

(Continued)

*Primary Examiner* — David K Moore
*Assistant Examiner* — Mark R Milia
(74) *Attorney, Agent, or Firm* — Xin Wen

(57) ABSTRACT

A data structure for a photo book kit includes a first data object, a second data object, and a third data object. The first data object includes first image data to define a first image, and a first image location to define the position of the first image on a page of a photo book. The second data object includes second image data to define a second image and a second image location to define the position of the second image on a cover of the photo book. The third data object includes third image data to define a third image and a third image location to define the position of the third image on a book accessory that is to be assembled with the photo book to form the personalized photo book kit.

8 Claims, 13 Drawing Sheets

U.S. PATENT DOCUMENTS

| | | |
|---|---|---|
| 2006/0008175 A1 | 1/2006 | Tanakat |
| 2006/0109516 A1* | 5/2006 | Catalan et al. ............... 358/302 |
| 2006/0210379 A1* | 9/2006 | Kearns ............................. 412/4 |
| 2007/0019924 A1* | 1/2007 | Teo et al. ......................... 386/4 |
| 2007/0226069 A1* | 9/2007 | Sanchez et al. ................ 705/26 |
| 2007/0284274 A1* | 12/2007 | Huang .......................... 206/424 |
| 2008/0043259 A1* | 2/2008 | Triplett et al. ................. 358/1.9 |
| 2008/0068665 A1* | 3/2008 | Niblett et al. ................. 358/302 |
| 2008/0129033 A1* | 6/2008 | Anderson et al. ............... 281/38 |
| 2008/0129034 A1* | 6/2008 | Anderson et al. ............... 283/67 |
| 2010/0047039 A1* | 2/2010 | Anderson et al. ................ 412/9 |

* cited by examiner

DATA STRUCTURE FOR PERSONALIZED PHOTO-BOOK PRODUCTS

BACKGROUND

In recent years, photography has been rapidly transformed from chemical based technologies to digital imaging technologies. Digital images captured by digital cameras can be stored in computers and viewed on electronic display devices. A user can upload digital images to a central network location provided by an image service provider such as Shutterfly, Inc. The user can store, organize, manage, edit, enhance, and share digital images at the central network location using a web browser or software tools provided by the service provider. A user can also design and order image-based products from the image service provider. The image-based products can include image prints, photo books, photo calendars, photo greeting cards, holiday cards, photo mugs, and photo T-shirts using image content provided by the user. The image-based products can be created for the user or as photo gifts for others. A high degree of personalization is desirable in the image-based products to make them memorable to the users or to the photo gift recipients.

SUMMARY

In one aspect, the present application relates to a manufacturing system for manufacturing a personalized photo book kit. The manufacturing system includes a computer configured to receive image data from a user, a first printer configured to print a first image on a book page in response to the image data received from the user, a second printer configured to print a second image on a book cover in response to the image data received from the user, and a third printer configured to print a third image on a book accessory in response to the image data received from the user.

In another aspect, the present application relates to a method for manufacturing a personalized photo book kit. The method includes receiving image data from a user, printing a first image on a book page in response to the image data, printing a second image on a book cover in response to the image data, printing a third image on a book accessory in response to the image data, and assembling book page, the book cover, and the book accessory to form a personalized photo book kit.

In another aspect, the present application relates to a data structure for a photo book kit. The data structure includes a first data object, a second data object, and a third data object. The first data object includes first image data to define a first image, and a first image location to define the position of the first image on a page of a photo book. The second data object includes second image data to define a second image and a second image location to define the position of the second image on a cover of the photo book. The third data object includes third image data to define a third image and a third image location to define the position of the third image on a book accessory that is to be assembled with the photo book to form the personalized photo book kit.

In another aspect, the present application relates to a data structure for an image based-product. The data structure includes a first data object to store a first image data for the first member of the image-based product; a second data object to store a second image data for the second member of the image-based product; and routing information that specifies the movement of at least one of the first member or the second member during the manufacturing of the image-based product.

In yet another aspect, the present application relates to a data structure for a photo book kit. The data structure includes a first data object to define a dust jacket; and a second data object. The second data object includes a third data object to define a book cover and a fourth data object to define a text block comprising a plurality of book pages, wherein the text block, the book cover, and dust jacket are configured to be assembled to form a photo book kit.

Implementations of the system may include one or more of the following. The manufacturing system can further include a book binder configured to bind a plurality of the book pages with the book cover to produce a personalized photo book. The manufacturing system can further include a consolidation station configure to consolidate the plurality of book pages with the book cover to allow the book cover to be bound with the book pages; and a packaging station configured to assemble the personalized photo book with the book accessory. The book cover can include a cover sheet and a support board, and wherein the second printer is configured to print the second image on a cover sheet. The manufacturing system can further include a case making machine configured to bond the cover sheet to the support board. The computer is configured to receive text information from the user and at least one of book page, the book cover, or the book accessory is printed with the text information. The second printer can be configured to print an image on a receiver that is to be bonded to a support member to form the book cover. The book accessory can include one or more of a bookmark, a book inset, a slip case, or a dust jacket. The first printer can be configured to print on a book page a symbol selected from a group comprising a registration mark, a cut mark, an alignment mark, routing information for the book page, and an identification for the book page, a photo book, or the photo book kit. The second printer can be configured to print on a book cover a symbol selected from a group comprising a registration mark, a cut mark, an alignment mark, routing information for the book cover, and an identification for the book cover, a photo book, or the photo book kit. The third printer can be configured to print on a book accessory a symbol selected from a group comprising a registration mark, a cut mark, an alignment mark, routing information for the book accessory, and an identification for the book accessory, a photo book or the photo book kit.

Implementations of the system may include one or more of the following. The first data object can further include at least one of page layout information, text on the page, a dimension of the page, a finish of the page, a page number, a background design of the page, a binding method, or an identification for the photo book. The second data object can further include at least one of layout information for the cover, text on the cover, a dimension of the cover, a finish of the cover, a background design of the cover, or a book finishing method. The third data object can further include at least one of a type of the book accessory, layout information of the book accessory, text on the book accessory, a dimension of the book accessory, a finish of the book accessory, or a background design of the book accessory. The data structure can further include identification for the photo book, the personalized photo book kit, or a user. At least one of the first data object, the second data object, or the third data object can store information for forming a registration mark, a cut mark, an alignment mark, identification, or routing information for the book page, the book cover, the book accessory, or the photo book kit. At least one of the first data object, the second data object, or the third data object can store parameters for rendering or scaling the first image data, the second image data, or the third image data.

Embodiments may include one or more of the following advantages. The disclosed system and methods can provide photo-book kits with high degree of personalization using image, text, and designs provided or selected by a user. The photo-book kits can include personalized photo content in the book pages, book cover, and book accessories. The personalized content and designs in the book pages, book cover, and book accessories can make a photo-book kit unique and personal to a user. Conventional photo book, in contrast, do not include personalized book covers or personalized book accessory. The disclosed personalized photo-book kit is especially suitable for memorializing special occasions in people's lives and as gifts for family and friends.

Another advantage of the disclosed system and methods is that the book pages, book cover, and book accessories can be holistically designed using personalized photo content to create a personalized photo-book kit. The personalized content printed on the book pages, the book cover, and the book accessories can be designed to follow a same theme that gives the photo-book kit a special presentation. The personalized content can be specifically tailored for the book pages, the book cover, and the book accessories in accordance with the overall design of the photo-book kit. The personalized content can be also incorporated in conjunction with the layout, the dimensions, and the material of the book pages, the book cover, and the book accessories. The personalized photo content can be automatically scaled and rendered to fit the layout of the book pages, the book cover, and the book accessories.

Another advantageous feature of the disclosed system and methods is that flexible and efficient data structures are provided to store information for manufacturing of the personalized photo book kit. The manufacturing information can include registration, cut, and alignment marks which can be used in fabrication and assembling of various components of the personalized photo book kit. The manufacturing information can also define the fabrication sequence of various components in the manufacturing workflow. The data structure can also carry image rendering parameters for the book pages, the book cover, and the book accessories in a personalized photo-book kit.

Another advantage of the disclosed system and methods is that a hierarchical data structure is provided to represent information for various components at different phases of the book manufacturing. The hierarchical data structure can minimize errors in the assembling of the personalized photo book kit. The hierarchical data structure can help the tracking and the routing of components at different phases of the fabrication and assembling. The hierarchical data structure can also reduce the number of the components to be remade when damage or an error has occurred, thus reducing cost related to the remaking of the personalized photo book kit. Moreover, the components for a photo book kit can be identified by unique identifications (IDs). The component ID can be encoded in barcodes. The barcodes can be printed on the components to ensure that the correct components are used in the assembling of a photo book kit. The barcodes can also include routing information to guide where finished components should be delivered for the next step of fabrication or assembling.

Another advantage of the disclosed system and methods is that the personalized photo-book kit can be flexibly designed and manufactured using network-based system. A user can upload his or her digital images to an internet service provider. The user can incorporate his or her digital images and develop other creative content for a photo book. The network-based infrastructure can also provide third-party content for the user to incorporate into his/her personalized photo-book kit.

Although the invention has been particularly shown and described with reference to multiple embodiments, it will be understood by persons skilled in the relevant art that various changes in form and details can be made therein without departing from the spirit and scope of the invention.

DETAILED DESCRIPTION

Figure 1:
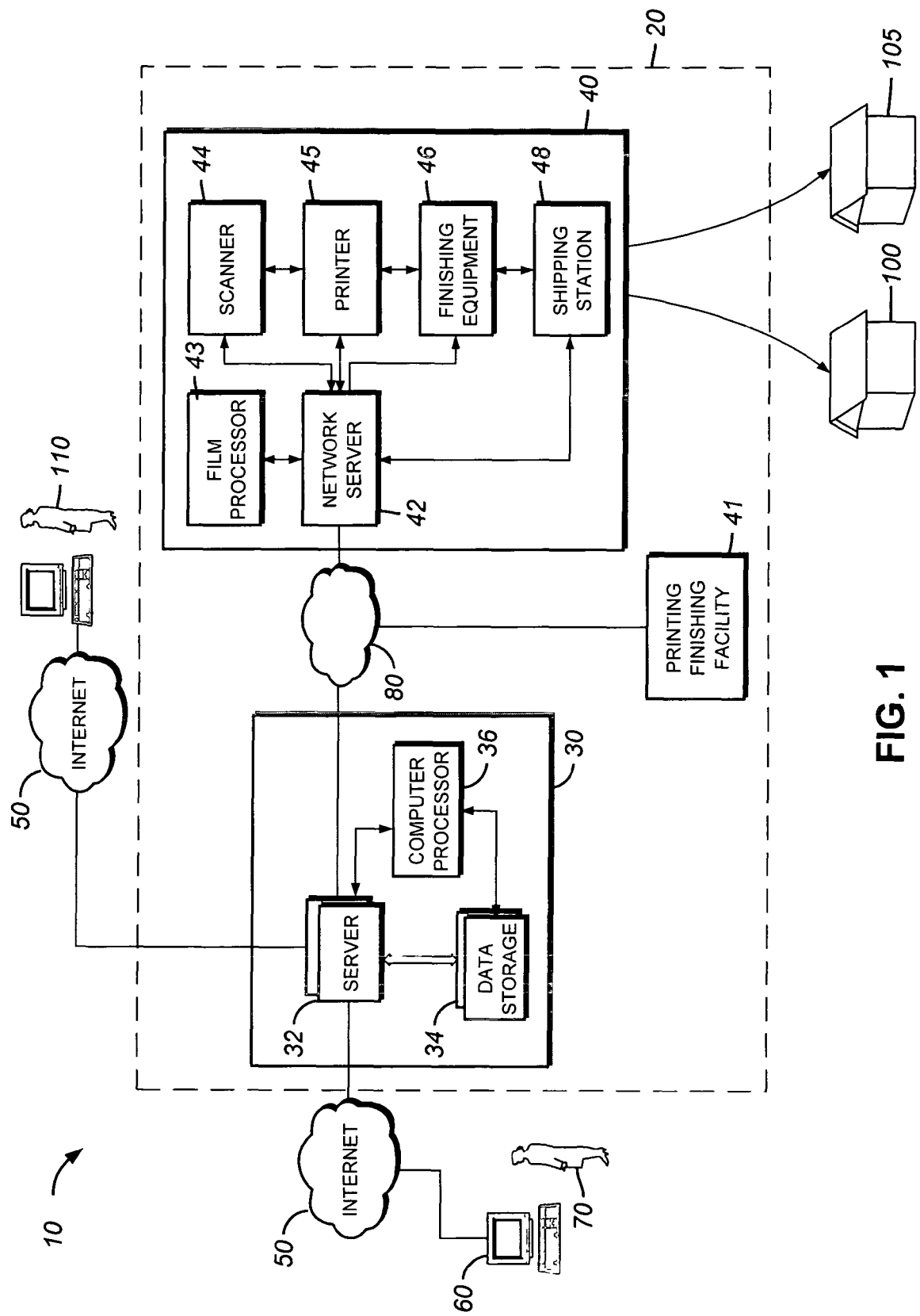
FIG. 1 is a block diagram of a system for producing personalized image-based products.

FIG. 1 shows a block diagram of a system 10 for producing personalized image-based products. An online photo system 20 can be established by an image service provider to provide image services and products on a wide area network such as the Internet 50. The online photo system 20 can include a data center 30, one or more printing and finishing facilities 40 and 41, and a computer network 80 that can facilitate the communications between the data center 30 and the finishing facilities 40 and 41.

In the present specification, the term "personalized" is used in personalized content, personalized messages, personalized images, and personalized designs that can be incorporated in the personalized products. The term "personalized" refers to the information that is specific to the recipient, the user, the gift product, or the intended occasion. The content of personalization can be provided by a user or selected by the user from a library of content provided by the image-server provided. The content provided can include stock images and content licensed from a third party. The term "personalized information" can also be referred to as "individualized information" or "customized information". Examples of personalized image-based products may include personalized photo greeting cards, photo prints, photo books, photo T-shirt, and photo, mugs etc. The personalized image-based products can include users' photos, personalized text, and personalized designs.

The term "photo book" refers to books that include one or more pages and at least one image on a book page. A photo books can include a photo albums, a scrapbook, a photo calendar book, or a photo snapbook, etc. The photo book in the disclosed system can include personalized image and text content provided by a user or by a third party. A "photo-book kit" in the disclosed system refers to a photo book comprising personalized content as described above, as well as one or more book accessories such as a slip case for a book, a book insert such as a bookmark, and a dust jacket. The "photo-book kit" in the disclosed system can include personalized content on the book pages, the book cover, and the book accessories.

The data center 30 can include one or more servers 32, data storage devices 34 for storing image data, user account and order information, and one or more computer processors 36 for processing orders and rendering digital images. An online-photo website can be powered by the servers 32 to serve as a web interface between the users 70 and the image service provider. The users 70 can order image-based products from the web interface. The printing and finishing facilities 40 and 41 can produce the ordered image-based products such as photographic prints, greeting cards, holiday cards, post cards, photo albums, photo calendars, photo books, photo T-shirt, photo mugs, photo aprons, image recording on compact disks (CDs) or DVDs, and framed photo prints.

The architecture of the data storage devices 34 is designed to optimize the data accessibility, the storage reliability and the cost. Further details on the image data storage in online photo system 20 are provided in the commonly assigned U.S. Pat. No. 6,839,803, titled "Multi-Tier Data Storage System", which is incorporated herein by reference.

The printing and finishing facilities 40 and 41 can be co-located at the data center 30. Alternatively, the printing and finishing facility 40 and 41 can be located remotely from the data center 30. The printing and finishing facilities 40 and 41 can be set up. Each printing and finishing facility 40 or 41 can be geographically located close to a large population of customers to shorten order delivery time. Furthermore, the printing and finishing facilities 40 and 41 and the data center 30 can be operated by different business entities. For example, a first business entity can own the data center 30 and host the website that can be accessed by the users 70. The printing and finishing facilities 40 and 41 can be owned and operated by a second business entity, which can be referred as an Application Service Provider (ASP), responsible for fulfilling the image-based products ordered through at the website.

The printing and finishing facility 40 can include one or more network servers 42, printers 45 for printing images on physical surfaces, finishing equipment 46 for operations after the images are printed, and shipping stations 48 for confirming the completion of the orders and shipping the ordered image-based products to the user 70 or recipients 100 and 105. The one or more network servers 42 can communicate with the data center 30 via the computer network 80 and facilitate the communications between different devices and stations in the printing and finishing facility 40. The computer network 80 can include a Local Area Network, a Wide Area Network, and wireless communication network.

The printers 45 can receive digital image data and control data, and reproduce images on receivers. The receivers can be separate photo prints, or pages to be incorporated into photo books. Examples of the printers 45 include can be digital photographic printers such as Fuji Frontier Minilab printers, Kodak DLS minilab printers, Imaging Solutions CYRA Fast-Print digital photo printer, or Kodak I-Lab photo printers. The printers 45 can include offset digital printers or digital printing presses such as HP Indigo digital printing press, Xerox's iGen printer series, etc. The printers 45 can also include large format photo or inkjet printers for printing posters and banners. The printing and finishing facilities 40 and 41 can include a film processor 43 for processing exposed films, and a scanner 44 for digitizing processed film stripes. The order information and image data can be transferred from servers 32 to the network servers 42 using a standard or a proprietary protocol (FTP, HTTP, among others).

The finishing equipment 46 can perform operations for finishing a complete image-based product other than printing, for example, cutting, folding, adding a cover to photo book, punching, stapling, gluing, binding, envelope printing and sealing, packaging, labeling, package weighing, and postage metering. The finishing operations can also include framing a photo print, recording image data on a CD-ROM and DVD, making photo T-shirts and photo mugs, etc. Furthermore, the printers 45 and the finishing equipments 46 can reside at different locations.

Figure 2:
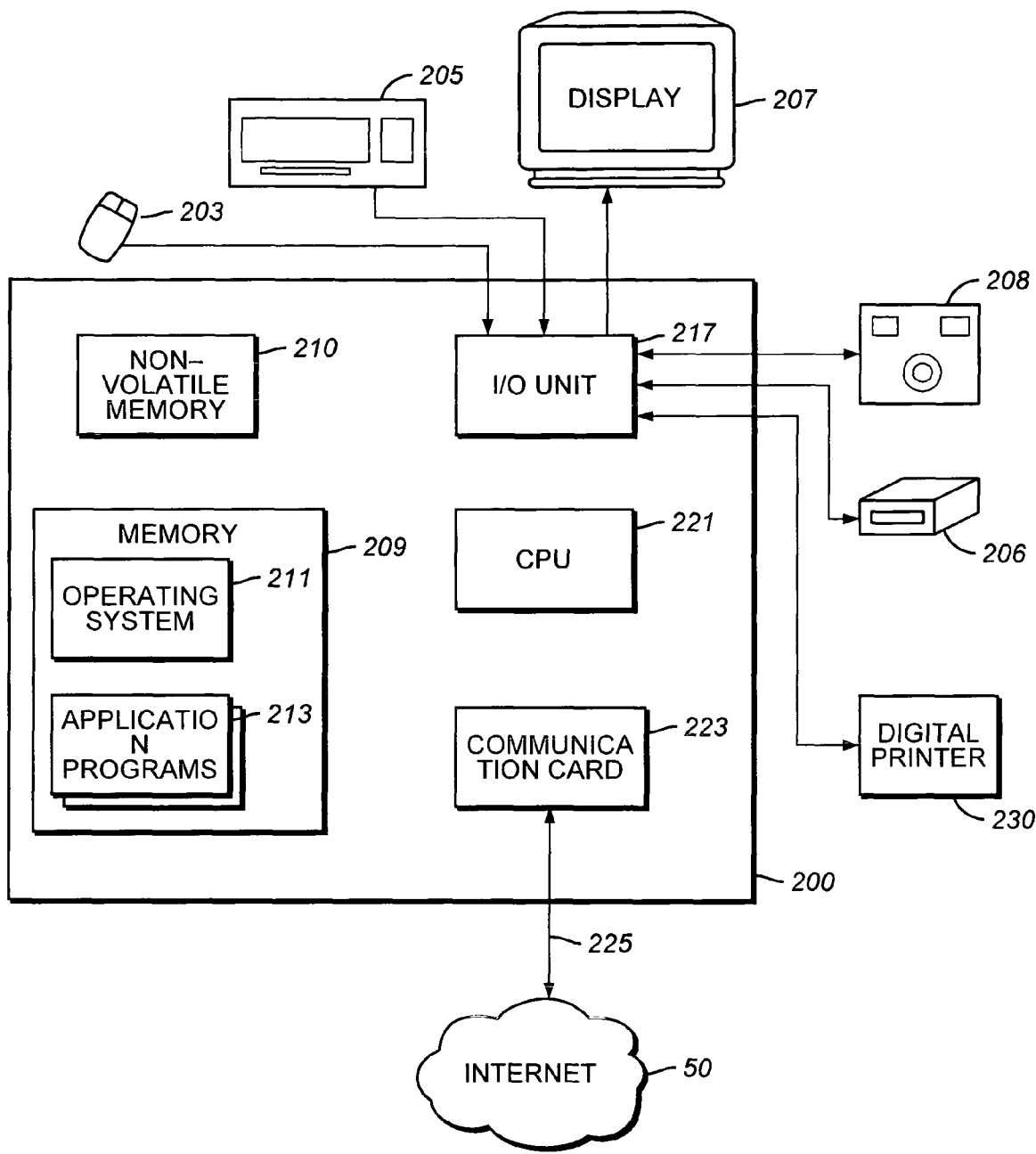
FIG. 2 shows a typical user's computer used with the system of FIG. 1.

A user 70 can access the online-photo website using a computer terminal 60 as shown in FIG. 2. The computer terminal 60 can be a personal computer, a portable computer device, or a public entry terminal such as a kiosk. The computer terminal 60 allows a user 70 to execute software to perform tasks such as communicating with other computer users, accessing various computer resources, and viewing, creating, or otherwise manipulating electronic content, that is, any combination of text, images, movies, music or other sounds, animations, 3D virtual worlds, and links to other objects. Exemplary components of the computer terminal 60, shown in FIG. 2, include input/output (I/O) devices (mouse 203, keyboard 205, display 207) and a general purpose computer 200 having a central processor unit (CPU) 221, an I/O unit 217 and a memory 209 that stores data and various programs such as an operating system 211, and one or more application programs 213 including applications for viewing, managing, and editing digital images (e.g., a graphics program such as Adobe Photoshop). The computer 200 also includes non-volatile memory 210 (e.g., flash RAM, a hard disk drive, and/or a USB memory card, a floppy disk, a CD-ROM, a DVD, or other removable storage media), and a communications device 223 (e.g., a modem or network adapter) for exchanging data with an Internet 50 via a communications link 225 (e.g., a telephone line).

The computer 200 allows the user 70 to communicate with the online-photo website using the wired or wireless communication card or device 223. The user 70 can set up and access her personal account. The user 70 can enter user account information such as the user's name, address, payment information (e.g. a credit card number), and information about the recipient of the image-based products. The user 70 can also enter payment information such as credit card number, the name and address on the credit card etc. The user 70 can upload digital images to the online-photo website. The user can store the images in an online photo album, create personalized image-based product at the web user interface, and order a personal image-based product and a gift product for specified recipients 100 and 105.

The computer 200 can be connected to various peripheral I/O devices such as an image capture device (digital camera, film scanner or reflective scanners). The peripheral device can be a digital camera 208. The digital images captured by a digital camera are typically stored in a memory card or a memory stick (e.g., SmartMedia™ or CompactFlash™) that are detachable from the digital camera. The digital images on the memory card can be transferred to o a non-volatile memory 210 using a card reader 206. The digital camera 208 can also be directly connected to the computer 200 using a Firewire or an USB port, a camera docking station, or a wireless communication port to allow digital images to be transferred from the memory on the detail camera to the computer's disk drive or the non-volatile memory 210.

The user 70 can also obtain digital images from film-based prints from a traditional camera, by sending an exposed film into a photo-finishing service, which develops the film to make prints and/or scans (or otherwise digitizes) the prints or negatives to generate digital image files. The digital image files then can be downloaded by the user or transmitted back to the user by e-mail or on a CD-ROM, diskette, or other removable storage medium. The users can also digitize images from a negative film using a film scanner that is connected to the computer 200 or from a reflective image print using a scanner. Digital images can also be created or edited using an image software application 213 such as Adobe Photoshop.

Once the digital images are stored on the computer 200, a user can perform various operations on the digital images using application programs 213 stored in memory 209. For example, an image viewer application can be used for viewing the images and a photo editor application can be used for touching up and modifying the images. An electronic messaging (e.g., e-mail) application can be used to transmit the digital images to other users. The application programs 213 can also enable the user 210 to create a personalized image-based product on the computer 200. Several of the above described imaging functions can be incorporated in a client software application that can be installed on a user's computer 200.

In addition to viewing the digital images on the computer display 207, the user 70 may desire to have physical image-based products made of digital images. Prints can be generated by the user 70 using a digital printer 230 that is connected to the computer 200. Typical digital printers 230 can include such as an inkjet printer or a dye sublimation printer. The user 70 can also purchase image-based products from the online image service provider. The production of these image-based products often require the use of commercial equipment which are usually only available at a commercial production location such as the printing and finishing facilities 40 and 41. An example for the online image service providers is Shutterfly, Inc., located at Redwood City, Calif.

The user 70 can be a consumer that accesses the computer terminal 60 from home or a public entry terminal. The user 70 can also be a business owner or employee that may access the computer terminal 60 at a retail location such as a photo shop or a printing store. The disclosed system is compatible with a retail imaging service using a local computer 200 at the point of sales, or an online photo system wherein a user 70 access a server 32 using a remote computer terminal 60. The formats of communication between the computer terminal 60 and the servers 32 as well as the graphic user interface can be customized for the consumer and commercial customers.

The computer terminal 60 can also be a public entry terminal such as a kiosk for receiving digital image data from the user 70 and uploading the digital images to the server 32. After the digital image files have been uploaded, the user can view, manipulate and/or order prints in the manners described above. The public entry terminal can also support various electronic payment and authorization mechanisms, for example, a credit or debit card reader in communication with a payment authorization center, to enable users to be charged, and pay for, their prints at the time of ordering.

An exemplified process of using the online image service can include the following. The user 70 sends digital images to the servers 32 provided by the online photo system 20 by uploading over the Internet 50 using a standard or a proprietary protocol (FTP, HTTP, XML, for example) or electronic communication application (for example, e-mail or special-purpose software provided by the photo-finisher). The user 70 can also send digital image data stored on an electronic storage medium such as a memory card or recordable CD by US mail, overnight courier or local delivery service. The photo-finisher can then read the images from the storage medium and return it to the user, potentially in the same package as the user's print order. The image service provider can load data or programs for the user's benefit onto the storage medium before returning it to the user. For example, the photo-finisher can load the storage medium with an application program 213 for the user to create a personalized image-based product on his computer 200.

The user 70 can also send a roll of exposed film, and processed film negatives to the image service provider. The exposed film is processed by the film processor 43 and digitized by the scanner 44 in the printing and finishing facilities 40 and 41. The digital image data output from the scanner 44 is stored on the data storage 34.

After the image service provider has received the user's digital images, the image service provider can host the images on the online photo website, at which the user can view and access the images using a web browser or a locally installed software application. The user 70 can access the online-photo website to create and design a photo-based product such as a photo book and a photo greeting card, and specify the images to be reproduced on an image-based product and parameters relating to printing (e.g., finish, size, number of copies). The user 70 can also designate one or more recipients 100 and 105 to whom the image-based products are to be sent.

After the user's images have reached the image service provider and have been made available online, the user can place an order with the image service provider. One way to place an order is by having the user 70 view the images online, for example, with a browser and selectively designate which images should be printed. The user can also specify one or more recipients 100 and 105 to whom prints should be distributed and, further, print parameters for each of the individual recipients, for example, not only parameters such as the size, number of copies and print finish, but potentially also custom messages to be printed on the back or front of a print. The user 70 can also authorize a recipient 110 to receive the user's images electronically by entering the recipient 110's email address and other electronic identifications.

The information entered by the user 70 can be stored on the server 32 and the data storage 34, and subsequently transmitted to a printing and finishing facility 40 or 41 for making the image-based products. The image-based products can include photographic prints, but also any other item to which graphical information can be imparted, for example, greeting or holiday cards, books, greeting cards, playing cards, T-shirts, coffee mugs, mouse pads, key-chains, photo collectors, photo coasters, or other types of photo gift or novelty item. The image-based products are printed by the printer 45 and finished by finishing equipment 46 according to the printing parameters as specified by the user 70. The image-based products are then delivered to the specified recipients 100 and 105 using standard U.S. Mail, or courier services such as Federal Express and UPS.

Figure 3:
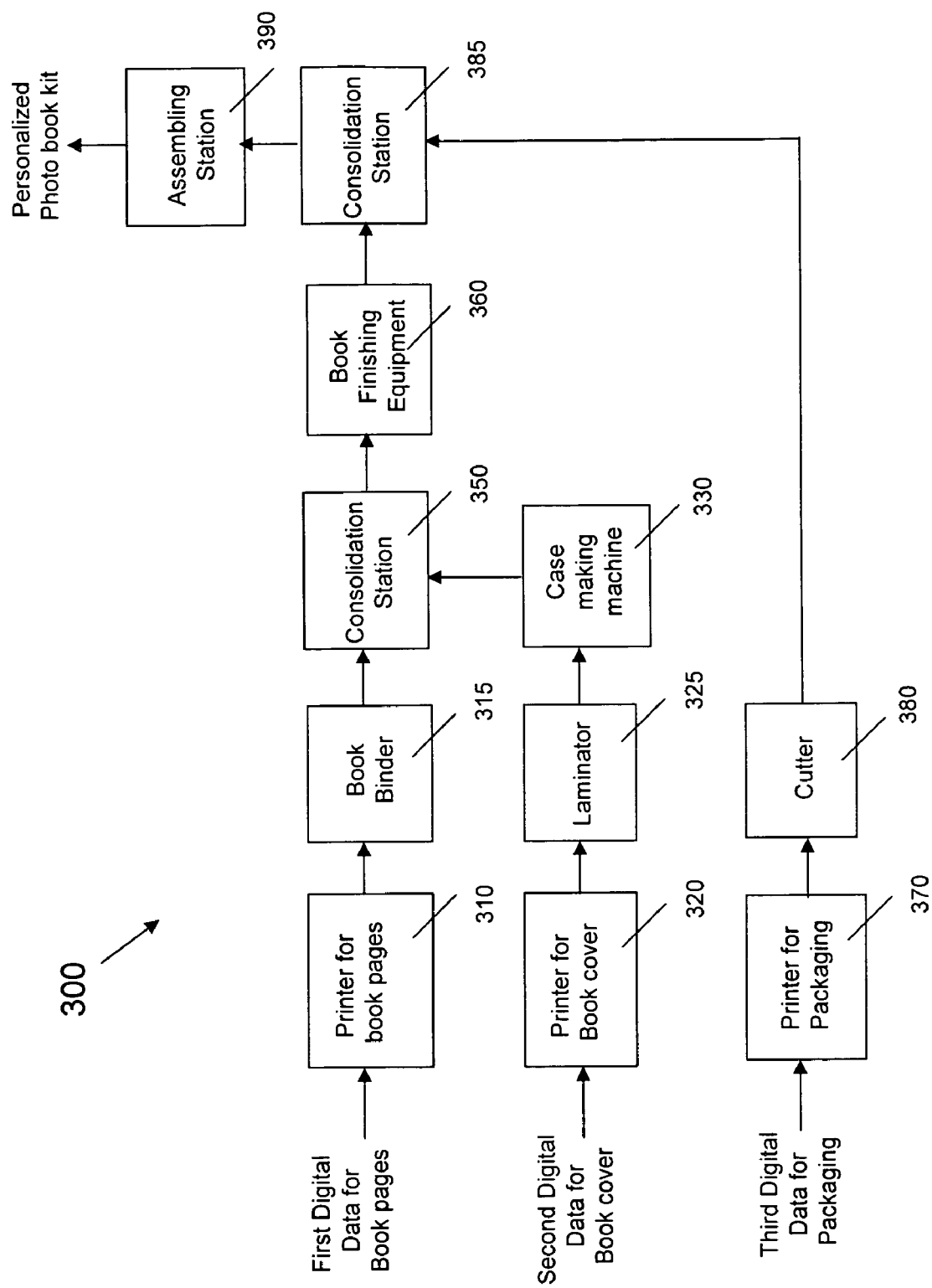
FIG. 3 is an exemplified flow diagram for manufacturing a personalized photo book.

Referring to FIG. 3, a manufacturing workflow 300 can be implemented to manufacture personalized photo-book kit in the printing and finishing facilities 40 and 41. The manufacturing workflow 300 can include manufacturing steps for book pages, text block, a book cover, and one or more book accessories in a personalized photo-book kit. The manufacturing workflow 300 can receive first digital data for producing personalized book pages, second digital data for producing a book cover, and third digital data for producing personalized book accessory.

Figure 4A:
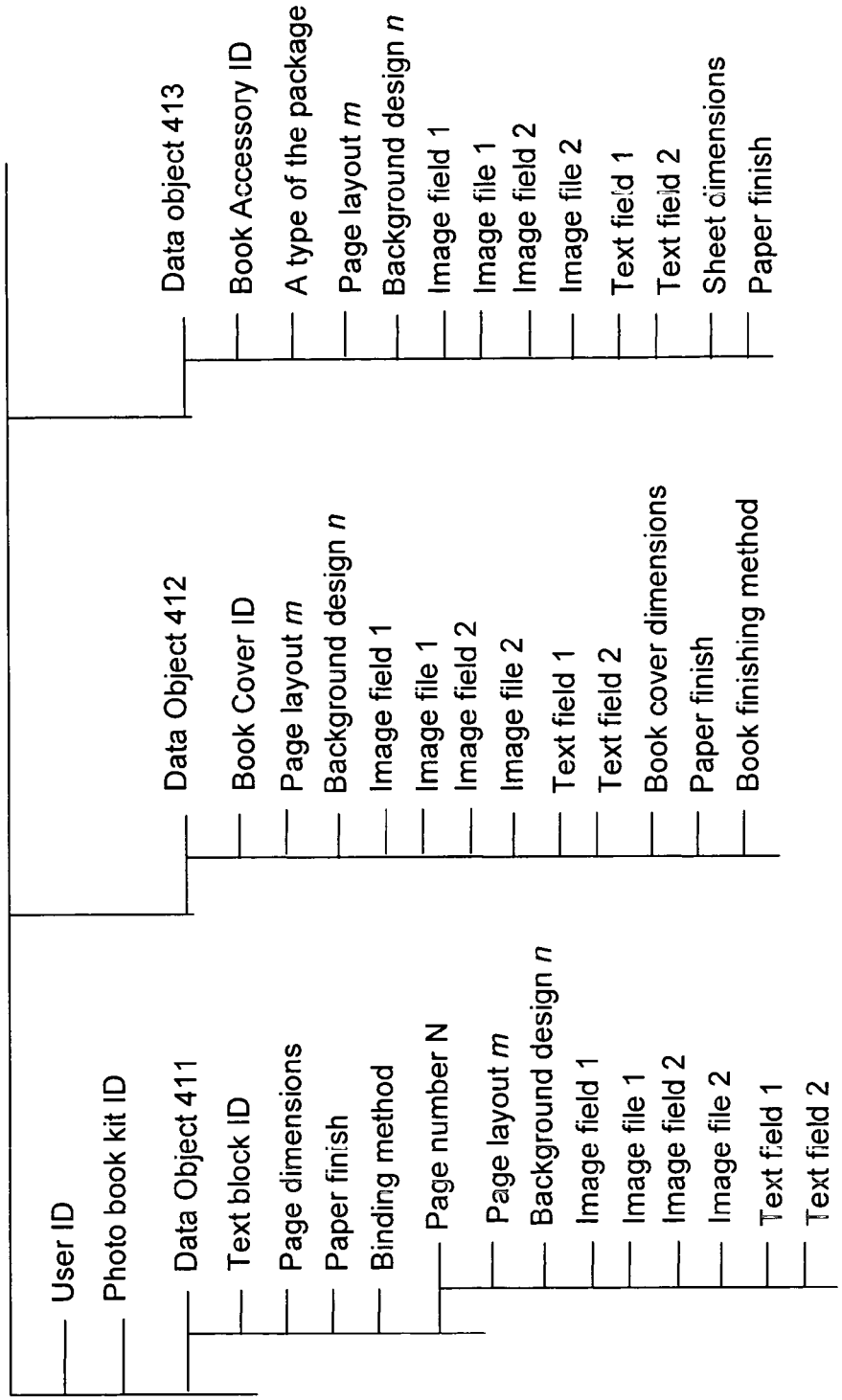
FIG. 4A illustrates an exemplified data structure for a personalized photo book.

An exemplified data structure 400 for a photo-book kit is shown in FIG. 4A. The data structure 400 can include user identification (ID) and a photo book kit ID for the photo book kit. The data structure 400 can also include a data object 411 for the pages or a text block of the photo book, a data object 412 for the book cover, and a data object 413 for the book accessory. The data structure 400 stores information that can be retrieved to form the first digital data, the second digital data, and the third digital data as input to the manufacturing workflow 300.

Figure 5:
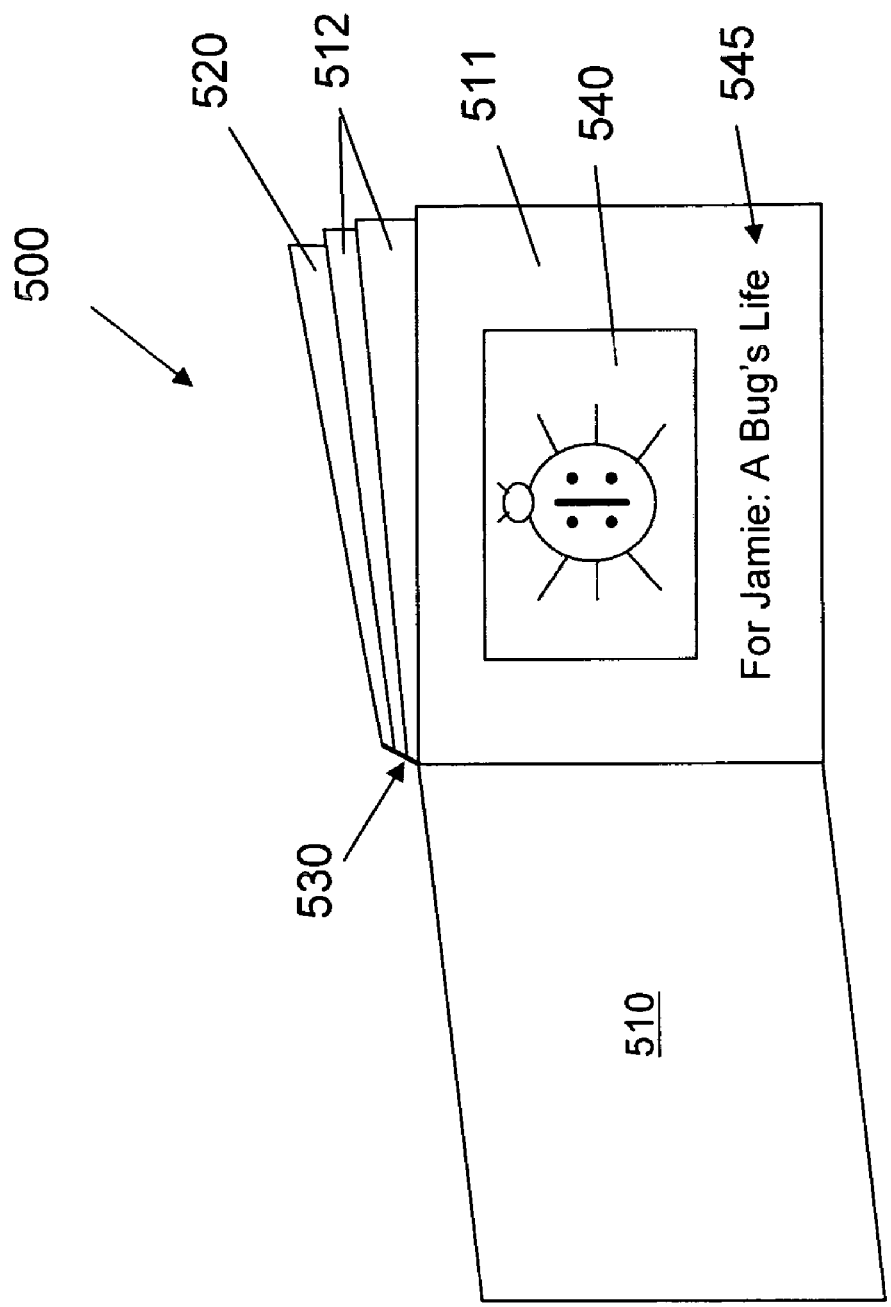
FIG. 5 illustrates a text block for a personalized photo book.

A photo book can include a plurality of pages 510, 511, 512, and 520, as shown in FIG. 5. The pages 510, 511, 512, and 520 can be bound in a text block 500, which is practiced in case binding. The text block 500 includes a first page 510, a spine 530, and a last page 520. The first page 510 and the last page 520 can also be referred as the end sheets (or leaves). At least one page 511 includes an image 540 provided by the user 70. The page 511 can also include a text field containing text information 545 provided by the user 70. In the cases of perfect binding, saddle stitching binding, coil and wire binding, the pages 510, 511, 512, and 520 are kept in loose pages and bound together with the book cover 600 to form the photo book 700 (shown in FIGS. 6 and 7).

Referring to FIG. 4A, the data object 411 can include an identification for the book pages or the text block for the photo book, the page size, paper finish, and the method for binding the book pages into a text block. Examples of the binding techniques include case binding, perfect binding, saddle-stitching, spiral binding, and coil binding. The data object 411 also include data objects for one or more pages. For example, the data object for page "N" can include a page number ("N") or separate page identifications, a page layout m, a back ground design n, one or more image fields, image file (or image data) for the images to be printed at the one or more image fields, and one or more text fields. The text fields can include captions for the image or a remark about the image on the book page.

Figure 6:
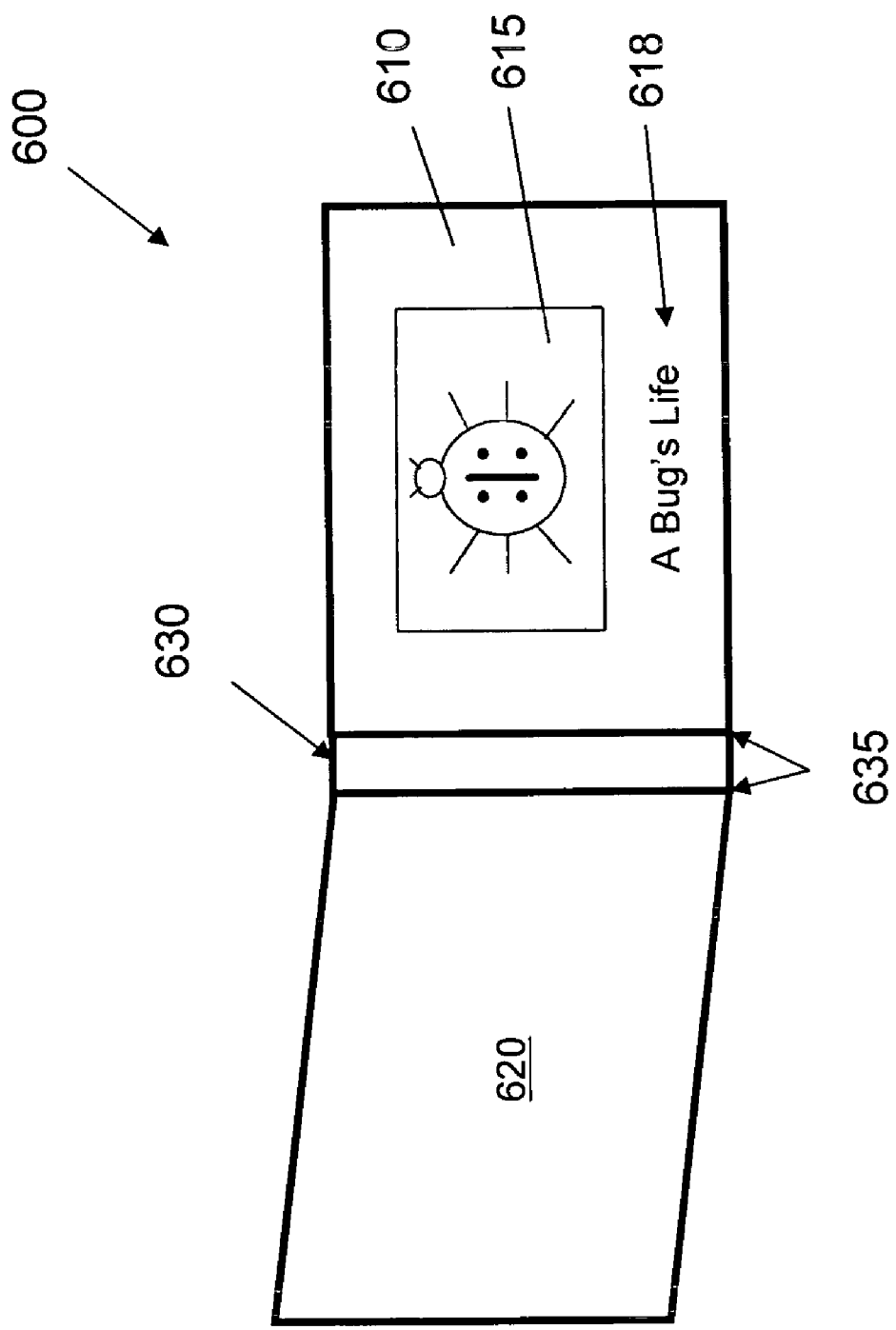
FIG. 6 illustrates a personalized cover for a personalized photo book.

A book cover 600, as shown in FIG. 6, can include a front cover 610, a spline 630, and a back cover 620. The front cover 610 and the back cover 620 are connected with the spline 630. In some implementations, the front cover 610 and the back cover 620 can be connected with the spline 630 at joints 635. The book cover can include a personalized image 615 and a text information 618 provided by the user 70. In some conventional photo books, a window is cut in the front cover 610 that allows a personalized image on the first page to be visible in the front cover of the photo book. The book cover is not personalized specific to the user. The book cover 600 allows a personalized image and text provided by a user directly printed on the front cover 610, the back cover 620, and/or the spline 630. The disclosed system and method thus provides personalization and flexible design to the book cover of the personalized photo book.

Referring back to FIG. 4A, the book cover can be identified by book-cover identification in the data object 412. The book cover can be defined by data fields such as a page layout m, a back ground design n, one or more image fields, image file (or image data) for the images to be printed at the one or more image fields, one or more text fields, page size, the book-cover structure, book cover finish, and the method for binding the book cover with the text block. The text fields can for example include a title or a date for the book. The image and the text can be positioned on the front cover 610, the back cover 620, the spline 630, or inside faces (510 and 520) of the book cover. The book-cover structure can specify one or more layers of receiver materials. The book cover can be finished with a matte, glossy, or a laminated finish. For example, a first receiver can receive image and text information. The first receiver can be laminated with a second support receiver such as a cup board. The paper finish can specify that the material of the first receiver and additionally, that the image-side of the first receiver can be coated with a transparent protective coating.

Another aspect of the disclosed system and methods is that photo book accessory can be personalized using user provided content. Book accessory can include a variety of components or accessories that can be combined or assembled with the photo book 700 and to form a photo book kit. The book accessory in present specification forms part of the photo-book product, and is different from packaging for shipping the photo-book product. For example, the photo book 700 can be inserted into a slip case 800 to form a photo book kit 900. A book mark 1000 can be inserted between pages 510, 511, 512, and 520 to form a photo book kit. A dust jacket 1100 can wrap around the front cover 610 and the back cover 620 of the photo book 700 to form a photo book kit. The dust jacket 1100 can include score lines 1110, 1112, and 1115 which assist the wrapping of the dust jacket 1100 at the edges of the front cover 610 and the back cover 620, and at the joints 635 of the book cover 600. The slip case 800 can include a front face 810 and an opening 820. The front face 810 of the slip case 800 can include a personalized image 830 and a message 835 provided by the user 70. The book mark 1000 can include a personalized image 1020 and a message 1030 provided by the user 70 on one or both sides of the book mark 1000. The dust jacket 1100 can include one or more personalized images 1120 and one or more messages 1130 provided by the user 70 on one or more faces of the dust jacket 1100.

Referring back to FIG. 4A, a book accessory is identified by one or more book accessory IDs in the data object 413. The data object for the book accessory can include a 30 data field defining one or more types of book accessory, which for example can include the slip case 800, a book insert such as the bookmark 1000, and the dust jacket 1100. The book accessory can be further defined by a page layout, a background design, one or more image fields, image files for the digital images to be positioned at the image fields, one or more text fields and their associated content, the dimensions for the book accessory material, and finish of the image receivers for the book accessory. It should be noted that a photo-book kit in the disclosed system and methods can include more than one personalized book accessories. For example, a photo book kit can include a personalized dust jacket and a personalized bookmark.

Referring back to FIG. 3, a printer 310 receives the first digital data for the personalized book pages and prints information on receivers from which the book pages will be formed. The first digital data include information defined in the data structure 400 and more specifically in the data objects for the book pages. The first digital data can include personalized image and text information provided by the user 70. At least one of the pages includes a user-provided personalized image (540). The printed book pages can be bound into text block 500 by the book binder 315. The disclosed system and methods can be implemented using a variety of book binding techniques such as case binding, perfect binding, saddle-stitching, spiral binding, and coil binding. In the case of case binding, the pages 510, 511, 512, and 520 are bound into a text block 500 by gluing and/or sewing. The pages 510, 511, 512, and 520 can be cut and trimmed after they are bound into the text block 500. The trimming operation can for example be conducted by a three-knife trimming which trims the edges of the pages 510, 511, 512, and 520 other than the ones forming the spine 530. Moreover, several text blocks can further be bound together by sewing before binding with a book cover 600. In some of the other book binding techniques (e.g. perfect binding, saddle-stitching, spiral binding, and coil binding), the book pages 510, 511, 512, and 520 can be kept as loose pages and the binding step at the book binder 315 can be skipped.

A printer 320 for the book cover can receive a second digital data for the personalized book cover. The second digital data can use data retrieved from the data structure 400 and image and text information provided by the user 70. The disclosed system and methods are compatible with a variety of book-cover structures and book-cover fabrication techniques. For example, for a hard cover photo book, the printer 320 can print personalized information on a cover sheet in accordance with the second digital data. The image side of the cover sheet is then coated by protective lamination layer by a laminator 325. The image side of the cover sheet forms the visible outer surface of the photo book cover. The lamination protective layer helps to protect the image from wear and tear during the usage of the photo book. The cup board provides stiffness to the book cover 600.

The cover sheet can then be assembled with a supporting cup board to make a book cover 600 by the case-making machine 330. The cover sheet is normally larger than the cup board. The cover sheet is cut to the desired size and shape. An adhesive is applied to the non-image surface of the cover sheet or the cup board. The cover sheet is pressed against the cup board, and folded and wrapped around the edges of the cup board to bond the cover sheet to the cup board.

The fabricated book cover 600 is then paired up with the associated book pages 510, 511, 512, and 520 or the text block 500 at the consolidation station 350. In some embodiments, the book cover 600 and at least one of the associated book pages 510, 511, 512, and 520 are printed with identification information to help identify and match the book cover 600 and the book pages 510, 511, 512, and 520. For example, the identification information can be encrypted in a bar code, which can be scanned and translated at the consolidation station 350.

Figure 7:
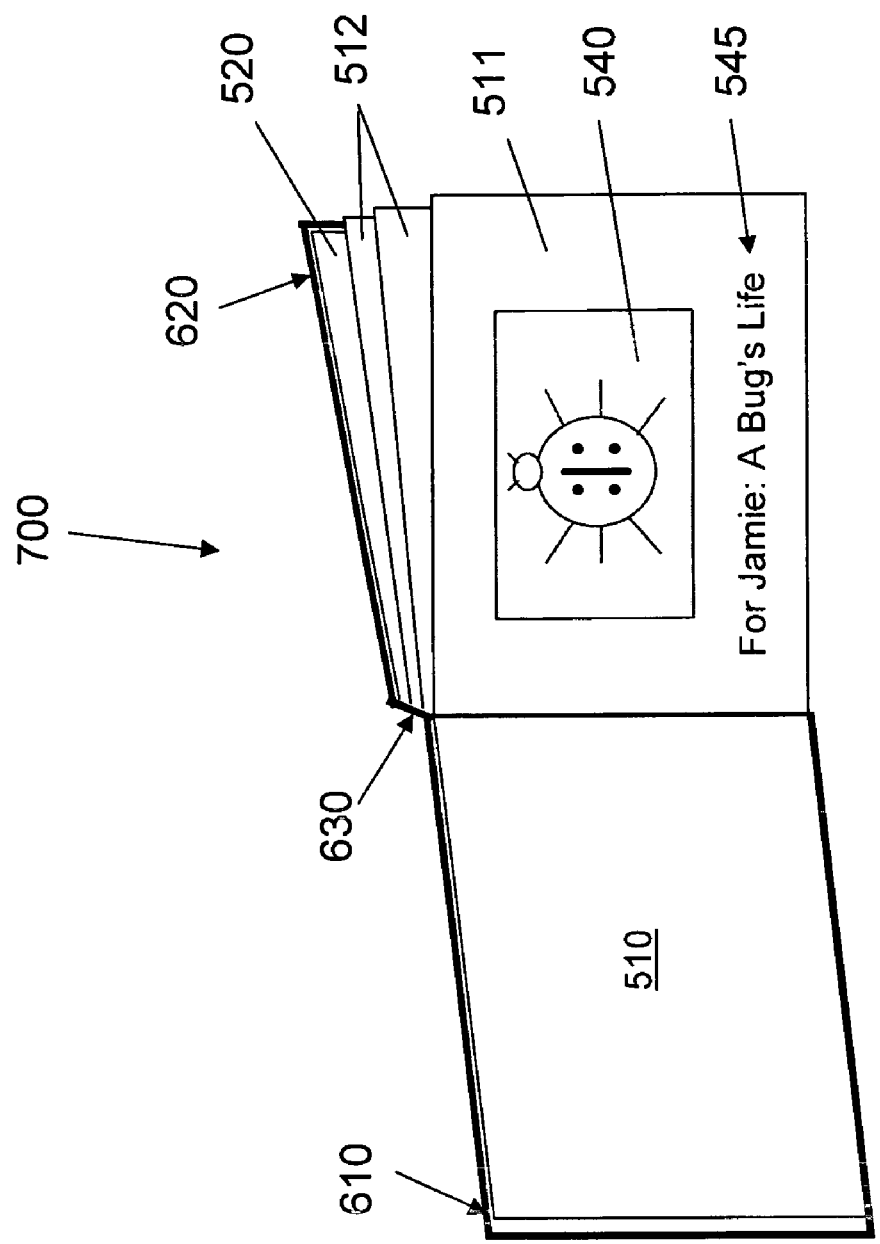
FIG. 7 illustrates a personalized photo book.
Figure 8:
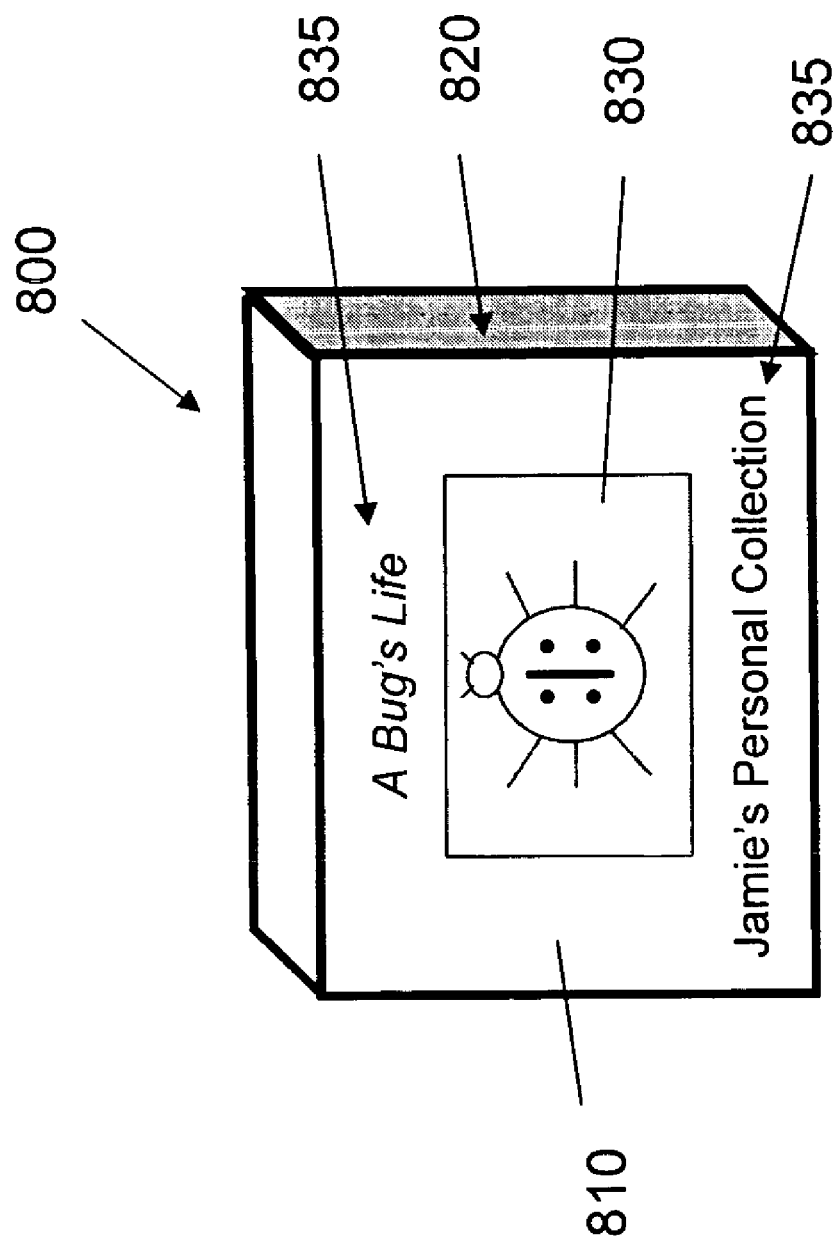
FIG. 8 illustrates a personalized slip case for a personalized photo book.
Figure 9:
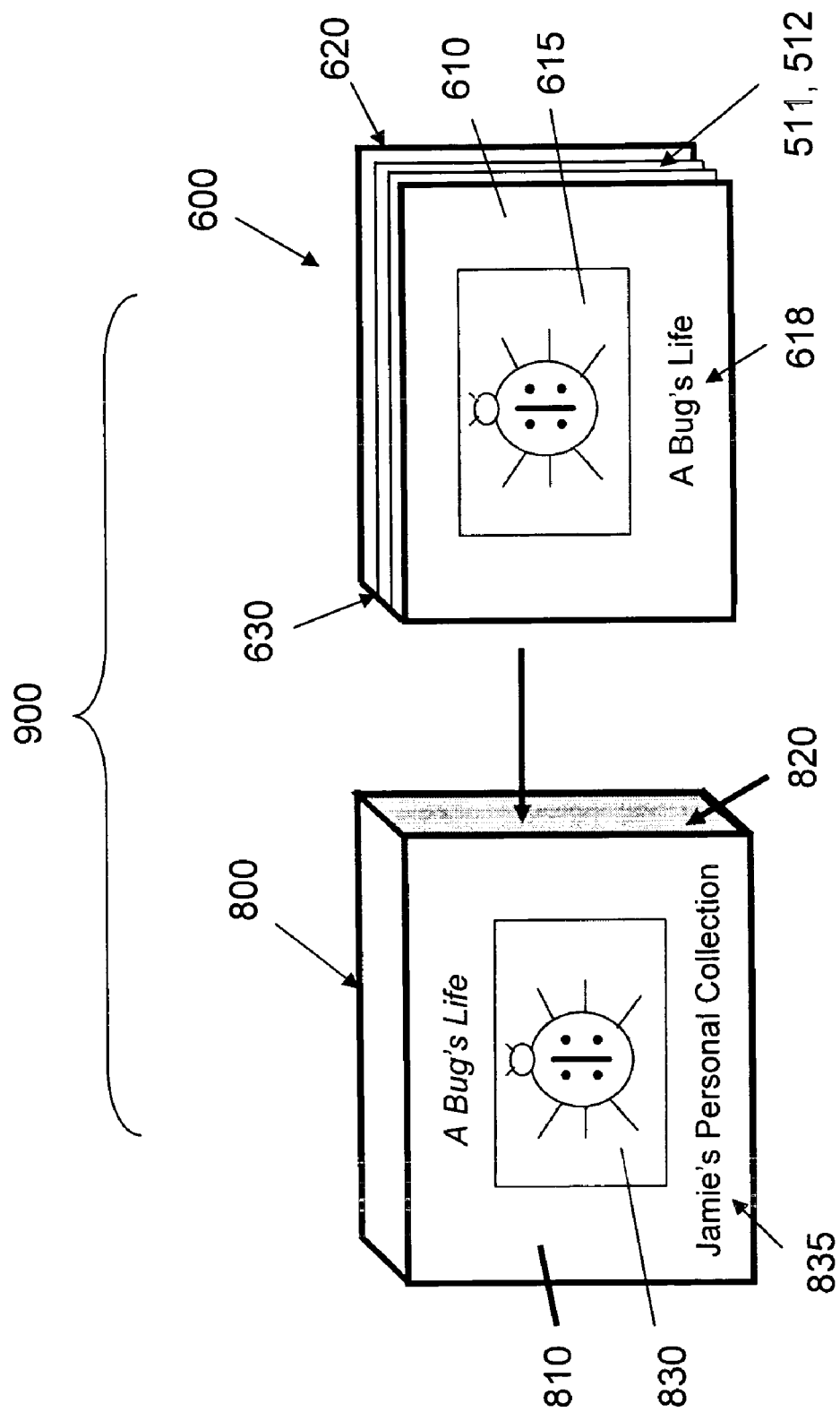
FIG. 9 illustrates the assembly of a personalized photo book with a personalized slip case.
Figure 10:
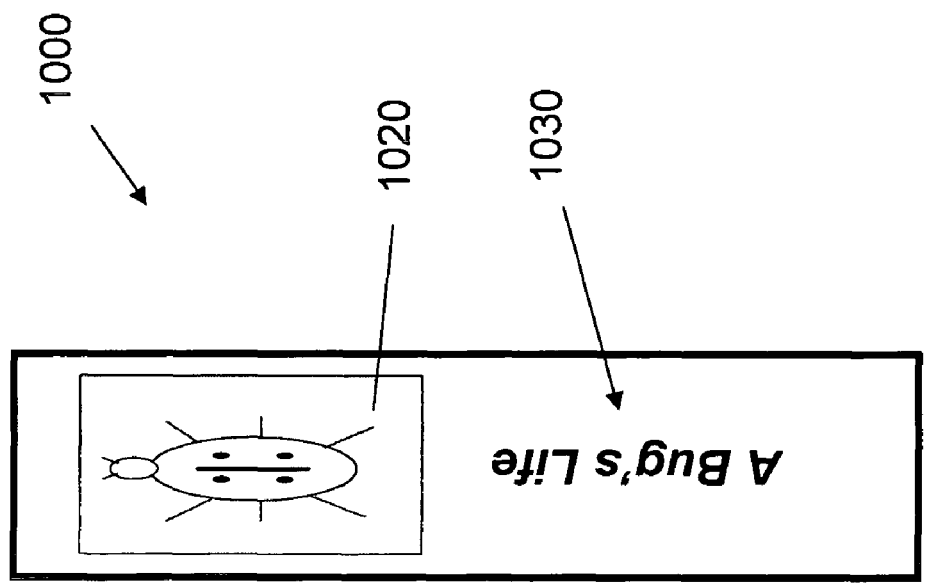
FIG. 10 illustrates a personalized book insert for a personalized photo book.
Figure 11:
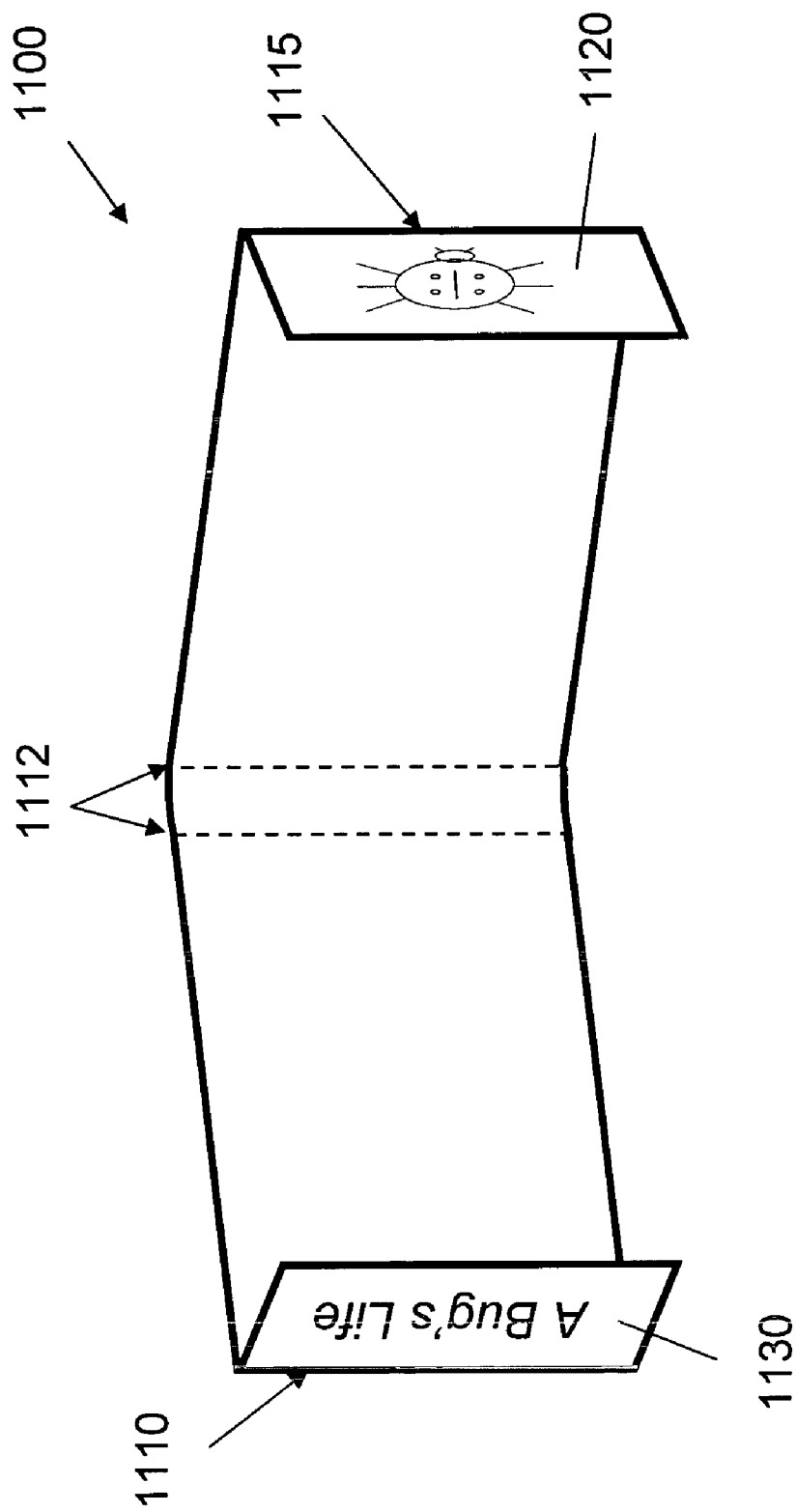
FIG. 11 illustrates a personalized dust jacket for a personalized photo book.

The book pages 510, 511, 512, and 520 or the text block 500 are next bound with the book cover 600 by the book finishing equipment 360. The specific book binding operation is dependent on the binding techniques. For example, the case binding technique involves the gluing the front face of the first page 510 to the inner face of the front cover 610, and the gluing of the back face of the last page 520 to the inner face of the back cover 620 by a "casing-in" machine. The text block 500 is first aligned to the book cover 600. An adhesive such as polyvinyl acetate (PVA) is uniformly applied to the relevant surfaces. A pressure can be applied to hold the separate pieces together to allow the glue to cure. As a result, the text block 500 is glued to the book cover 600 to form the photo book 700, as shown in FIG. 7. In perfect binding, the book pages 510, 511, 512, and 520 are glued together and with the spline 630 of the book cover 600 by the book finishing equipment 360 at the same step. The pages 510, 511, 512, and 520 and the book cover 600 can also be bound by stapling, or spiral and wire binding through a sequence of punched through holes.

A printer 370 receives a third digital data and prints on a receiver that will form (a part of) the personalized book accessory such as the slip case 800, the book mark 1000, and the dust jacket 1100. The third digital data can be retrieved in part from the data objects defining book accessory in the data structure 400. The third digital data can include personalized image and text information as previously described. The printer 370 can print the personalized and static information on a receiver. The steps following the printing can be dependent on the specific types of the personalized book accessory. For example, the receiver can be cut by a cutter 380 such as a die cutter to form the book mark 1000. The construction of the slip case 800 can include cutting, folding, and gluing of the receiver. The printed personalized information is arranged to be displayed on the front face 810 of the slip case 800. The making of the dust jacket 1100 can include cutting and scoring to for scoring lines 1110, 1112, and 1115 after personalized image and text information is printed on the receiver.

Figure 4B:
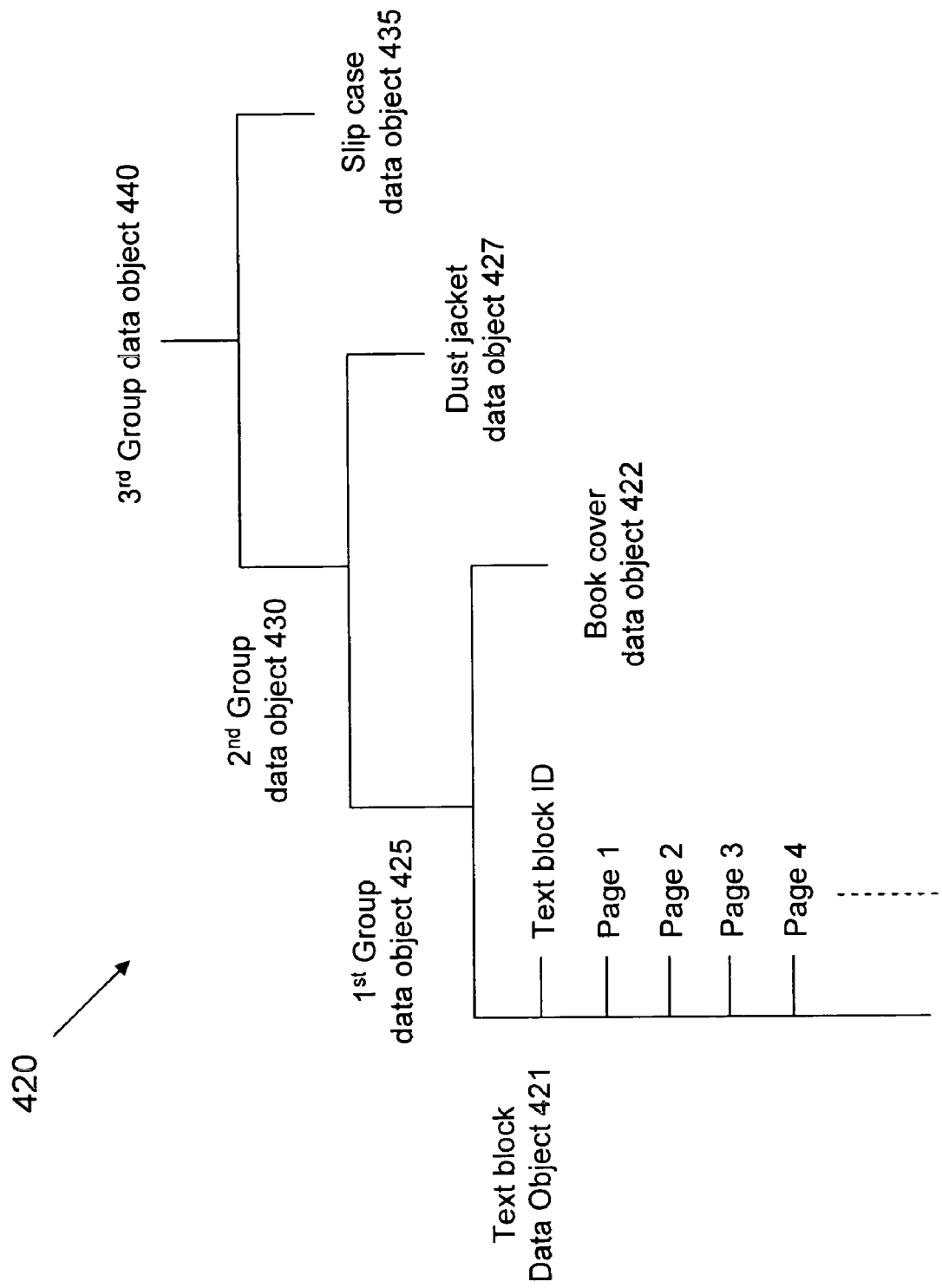
FIG. 4B illustrates another exemplified data structure for a personalized photo book.

The personalized photo book 700 and the personalized booking accessory can be consolidated at the consolidation station 385, and assembled at the packaging station 390 to form the personalized photo book kit 900. In one aspect, the functions of consolidation station and packaging station can be combined at one station. Furthermore, multiple consolidation stations and assembling stations (such as 385, and 390) can be provided for assembling the photo-book kit at different phases of the manufacturing, as shown in FIG. 4B and discussed in the related discussions. For example, after a dust jacket is consolidated and assembled with a photo book, a slip case (or a book insert) can be further be consolidated and assembled with the photo book wearing the dust jacket. The final photo book kit 900 may subsequently be combined with other products that the user 70 ordered, and packaged using shipping packaging material at the ship station 48, and subsequently shipped to recipient 100 or 105.

In some embodiments, a hierarchical data structure 420 is implemented as shown in FIG. 4B. A data object 421 can store information for a text block. The data object 421 can include a text block ID, and data objects for a plurality of pages, each of which can contain information similar to those depicted for a page data object as shown in FIG. 4A. A data object 422 can store data for a book cover. The data object 422 can include information as depicted for the book cover data object as shown in FIG. 4A. The data objects 421 and 422 can be combined to form a first-group data object 425. The first-group data object 425 can be combined with a dust jacket data object 427 to from a second-group data object 430. The second-group data object 430 can further be combined with a slip-case data object 435 to form a third-group data object 440. Each of the data objects 421, 425, 430, 422, 427, and 435 can also include an identification of the personalized photo book kit.

Unlike mass produced books containing only static information, the photo-book kit in the disclosed system and methods include a combination of uniquely produced components. One advantage of the data structure 420 is that the hierarchical structure can capture the sequence (or phases) of the assembling of a personalized photo-book kit. As shown in FIG. 3, a text block can be manufactured (at by the printer 310 and the book binder 315) in accordance with data stored in the text-block data object 421. A book cover can be separately fabricated (by the printer 320, the laminator 325, and the case-making machine 330) in accordance with data stored in the book-cover data object 422. The consolidation (at the consolidation station 350) and the book finishing (by the book finishing equipment 360) of the text block and the book cover are defined by the first-group data object 425. A book jacket and a slip case can be fabricated by the printer 370, cutter 380 and other equipment if needed in accordance with dust-jacket data object 427 and the slip-case data object 435. A dust jacket and the photo book can be assembled and packaged at the assembling station 390 in accordance with the second-group data object 430. A photo book wearing the dust jacket can be assembled with a slip case at a book accessory station in accordance with the third-group data object 440. One or more packaging stations may be provided to handle different stages of assembling of the personalized photo-book kit.

In one aspect of the present specification, each stage of the personalized photo-book manufacturing and assembling can be represented by an assembly phase. Each manufacturing phase can be conveniently defined by one or more data structures. For example, a book-assembly phase can be defined by the first-group data object 425. The photo book and the dust jacket are assembled in the next assembly phase, which is defined by the second-group data object 430. The components and the finished products at each assembly phase of the personalized photo book kit can thus be tracked in accordance with the data objects at different levels of the hierarchical data structure 420. If an error or damage occurs to a component of the photo book kit, the data objects can be conveniently used for dissembling the product components at each assembly phase to the photo-book kit. Only the damaged or the in-error component, instead of the whole personalized photo-book kit, needs to be re-fabricated. The corrected component(s) can be reassembled to produce a correct personalized photo-book kit according to the hierarchical data structure 420.

In another aspect of the present specification, the components of the personalized photo-book kit can be identified by an identification that can be stored in the corresponding data object. The identification can be alphanumerical symbol that uniquely defines the component. The identification can ensure the correct components to be assembled to for the correct products at each assembly phase. For instance, a barcode that encodes a text block ID can be printed on a text block. The book cover, the dust jacket, and the slip case can each be defined by an ID stored in the data field in their corresponding data structures (422, 427, and 435). Barcodes can be printed on the book cover, the dust jacket, and the slip case to uniquely identify these components. The barcodes printed on these components can be scanned at the consolidation station 350 and the packaging station 390 to ensure the components are used at each assembly phase. In another example, the barcode printed on a damaged book cover can be scanned to ensure the proper remaking of the book cover for replacement.

Figure 4C:
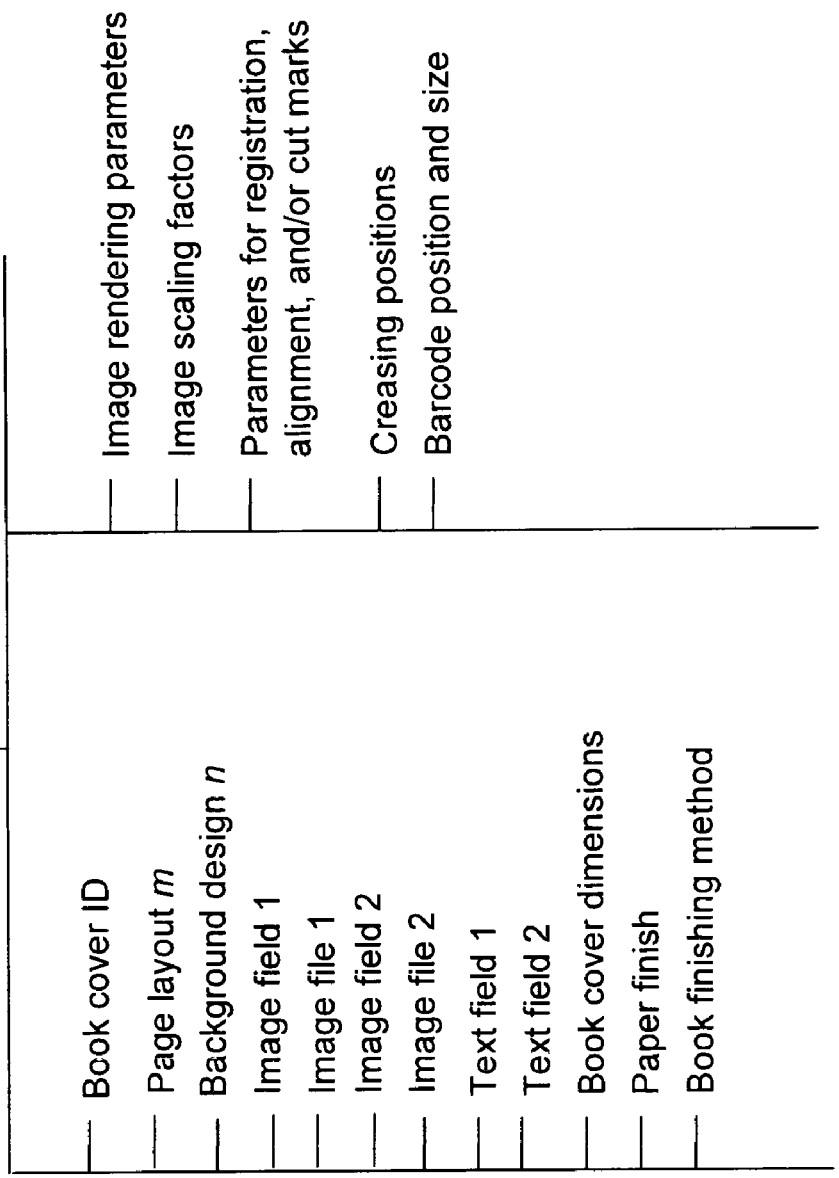
FIG. 4C illustrates another exemplified data structure for a photo-book cover.

In yet another aspect of the present specification, image rendering parameters can be stored in data structures for the various components in a personalized photo-book kit. For example, a book-cover data object 422, as shown in FIG. 4C, can include image rendering parameters such as image scaling factors, and image aspect ratio. The image scaling factor and the image aspect ratio can depend on not only the size of the photo book, but also the designs and the styles of various book components. The image rendering parameters can include color processing parameter (tone curve calibration, color balance or color temperature, color styles such as color, black and white, and Sepia etc.). The image rendering parameters can also include specifications for special effects such as oil painting, outline, image sharpening, or image softening.

The image rendering parameters can differ for different components of a personalized photo-book kit. For example, an image for a book cover may be rendered to have an oil painting effect. A same image on a page of photo book may not have the oil painting effect. Instead, the image may be softened on the book page. In another example, slip case may include a colored image. The same image may be printed in sepia tones on a dust jacket as required by the design of the dust jacket. In another example, the rendering of an image for a book cover needs to produce additional image area that is on the portion of cover sheet to be wrapped around the cupboard that provides the support to the book cover. Similarly, the dust jacket needs to have a surface area larger than the outer surface of a photo book. The rendering of an image for a dust jacket needs to take into account which portion of the image is to be exposed on the outer surface of the photo book and which portion is to be placed on the inner surface of the book cover.

In another aspect of the present specification, the data object can include data fields to store information to assist the manufacturing process. For example, the book-cover data object 422 can include a description for registration marks, cut marks, alignment marks, positions for creasing of the book cover, and the location, size, and the pattern for a barcode that can identify the book cover. The registration marks, cut marks, and the alignment marks can be printed in an area that can be seen during manufacturing but not visible in the final product. For example, alignment marks can be printed on the inside faces of the book cover to assist the alignment between the text block and the book cover. The alignment marks can be covered once the first page 510 and the last page 520 of the text block are glued to the inner surface of the book cover. The bar code for the book cover can define the spline width as well as routing instructions for the photo cover. The routing of the book cover can, for example, direct the book cover to be moved to the consolidation station where the corresponding text block is or will be stored.

Similarly, a dust jacket can be rendered to allow for a larger wrap around the width of the cover while the height is equal to the final height of the book plus bleed. A dust jacket can also carry a bar code that contains identification for the dust jacket and defines a spline width and the consolidation station for dust jacket. A dust jacket can also include the registration marks and cut marks similar to the cover image sheet for a book cover as described above. The book pages can also include cut marks that can be cut off when the pages are trimmed in the text block. The description of these cut marks can also be stored in data fields in the data objects for the book pages.

It should be noted that the positions of various marks (e.g., registration, cut, alignment, etc.) for manufacturing can be dependent on the type of binding. For example, the image areas and crease line locations can be different for the casing-in binding and the perfect binding. Moreover, the locations and the sizes of the text and image objects can also depend on the binding type.

It is understood that the above disclosed system and methods can be implemented in various forms without deviating from the spirit of the specification. For instance, more than one user can be involved in the creation of a photo book incorporating personal photo content and sellable pages from a third party. The users can collaboratively create the photo book using a local computer system or a network-based system. Details about how users can collaboratively create photo books are disclosed in commonly assigned U.S. patent application Ser. No. 11/207,666, titled "System and methods for collaborative scrapbook creation", filed on Aug. 19, 2005, the disclosure of which is incorporated herein by reference.

Further details about the creation and the design personal photo books are disclosed in commonly assigned U.S. patent application Ser. No. 11/450,108, entitled "Flexible system for making photo books", filed on Jun. 9, 2006 and commonly assigned U.S. patent application Ser. No. 11/176,049, entitled "Automatic generation of a digital photo album", filed on Jul. 7, 2006, the disclosure of these application is incorporated herein by reference.

The above described book manufacturing equipment and techniques are examples for illustrating the concepts in the present specification. The disclosed system and methods are not limited to these exemplified book manufacturing equipment and techniques. In addition, a wide range of accessories and personalization features are also compatible with the photo book kit in the present specification. For example, the personalized photo-book kit can include decorative metal corners, corner charms, and customized mattes applied to a cover photo. Furthermore, the personalized image or text information printed on the book pages, the book cover, and the book accessory material should differ or overlap with each other. The personalized image or text information printed on the book pages, the book cover, and the book accessory material can follow a general personalized design or theme to make the photo book kit a unique personalized product.

The data structures are also not limited to the specific structures and data fields shown in FIGS. 4A-4C. For example, a hierarchical data structure can include more or fewer levels of groups and more or fewer components for each group level. Many other symbols for the manufacturing process can be stored in the data structures and be printed on the components of the personalized photo book kit.

The invention claimed is:

1. A manufacturing system for manufacturing a personalized photo book kit, comprising:
   a computer configured to receive first images, a second image, and a third image from a user;
   a first printer configured to print the first images on a plurality of book pages, wherein the first printer is configured to print a first symbol on the text block to direct the text block to be routed to the first consolidation station;
   a first binder configured to bind the plurality of the book pages into a text block;
   a second printer configured to print the second image on a book cover, wherein the second printer is configured to print a second symbol on the book cover to direct the book cover to be routed to the first consolidation station;
   a first consolidation station configure to allow the first symbol to be detected on the text block and the second symbol to be detected on the book cover to allow the text block with the book cover to be paired up;
   a second binder configured to bind the text block to the book cover to produce a personalized photo book;
   a third printer configured to print the third image on a book accessory; and
   a second consolidation station configured to consolidate the personalized photo book with the book accessory to allow a personalized photo book kit comprising the personalized photo book and the book accessory to be assembled.

2. The manufacturing system of claim 1, wherein the third printer is configured to print a third symbol on the book accessory to direct the book accessory to be routed to the second consolidation station.

3. The manufacturing system of claim 1, wherein the book cover comprises a cover sheet and one or more support boards, wherein the second image is printed on the cover sheet by the second printer, the manufacturing system further comprising a case making machine configured to bond the cover sheet to the one or more support boards.

4. The manufacturing system of claim 1, wherein the book accessory comprises a bookmark or a book insert.

5. The manufacturing system of claim 1, wherein the book accessory comprises a slip case.

6. The manufacturing system of claim 1, wherein the book accessory comprises a dust jacket.

7. The manufacturing system of claim 1, wherein the computer is configured to receive text information from the user and at least one of book page, the book cover, or the book accessory is printed with the text information.

8. The manufacturing system of claim 1, wherein the third image is selected by the user to be the same as one of the first images.

* * * * *